(12) United States Patent
Peck

(10) Patent No.: US 8,019,463 B2
(45) Date of Patent: Sep. 13, 2011

(54) RECONFIGURABLE LIGHT-DIRECTED PICK/PUT SYSTEM

(76) Inventor: John C. Peck, Seneca, SC (US)

( * ) Notice: Subject to any disclaimer, the term of this patent is extended or adjusted under 35 U.S.C. 154(b) by 799 days.

(21) Appl. No.: 11/217,806

(22) Filed: Sep. 1, 2005

(65) Prior Publication Data

US 2007/0050080 A1   Mar. 1, 2007

(51) Int. Cl.
*G06F 7/00* (2006.01)
(52) U.S. Cl. .................. 700/213; 700/214
(58) Field of Classification Search .......... 700/214, 700/213, 215, 216, 241, 242; 235/385; 705/22, 705/28, 29
See application file for complete search history.

(56) References Cited

U.S. PATENT DOCUMENTS

| | | |
|---|---|---|
| 3,739,339 A | 6/1973 | Hillhouse et al. |
| 5,505,473 A | 4/1996 | Radcliffe |
| 5,877,698 A | 3/1999 | Kusnier et al. |
| 5,959,866 A * | 9/1999 | Hanaoka et al. ............. 700/214 |
| 6,124,800 A | 9/2000 | Beard et al. |
| 6,330,489 B1 * | 12/2001 | Iwakawa ....................... 700/218 |
| 6,711,458 B1 * | 3/2004 | Kofoed ......................... 700/213 |
| 6,775,588 B1 * | 8/2004 | Peck ............................. 700/214 |

* cited by examiner

*Primary Examiner* — Ramya Prakasam

(57) ABSTRACT

The present invention is directed to a reconfigurable light-directed pick/put system which includes at least one stationary storage bay unit including a plurality of reconfigurable physical storage locations for containing stored items to be picked and a plurality of intelligent light assemblies for directing the pick. Also disclosed is at least one mobile unit including a plurality of reconfigurable physical storage locations for containing items having been put after picking. Upon reconfiguration of a physical storage location in order to accommodate items of differing size or quantity, the intelligent light assembly associated with the reconfigured physical storage location is readily repositionable therewith. In order to provide such repositionability the present intelligent light assemblies include proximity switches, which are operable through an optically transparent raceway cover.

16 Claims, 6 Drawing Sheets

RECONFIGURABLE LIGHT-DIRECTED PICK/PUT SYSTEM

FIELD OF THE INVENTION

The invention is directed to a distributed system of intelligent automata: it is in part a light-directed, coupled system to facilitate the retrieval of stock keeping units (SKUs) stored in uniquely identified locations and subsequent placement of these same items into uniquely identified receptacles. More specifically the present invention is directed to a light directed pick/put system wherein at least the pick location controllers and light modules are readily reconfigurable. The present invention also is directed to a pick/put system employing a mobile unit capable of locating items to be picked and providing a plurality of storage receptacles for sorting and storing the picked items of multiple orders.

BACKGROUND OF THE INVENTION

Filling orders from stored inventory requires at least three steps: locating the precise item in the storage facility, retrieving (or picking) the desired quantity of that item, and storing (or putting) the retrieved items in a designated container or receptacle. The basic steps may apply to a variety of situations in which items must be identified, selected, and distributed or placed in a second location. Frequently this process is generally described in terms of order fulfillment in a warehouse.

Storage in a facility may be viewed as a nested or hierarchical arrangement with bays arranged along aisles, shelves or storage containers located in or on a bay, and items located in or on a shelf. Thus, the location of a specific item, commonly referred to as a Stock Keeping Unit or SKU, would be an "address" in the storage facility comprising the aisle, the bay along that aisle, and a shelf, bin or container located in the bay. So long as a protocol exists to associate only one SKU with each unique combination of aisle, bay, and shelf, identification of a particular SKU is unnecessary to identify or characterize the item to be picked, since the address of the item is sufficient.

In an exclusively manual system, an employee receives an order for a specific item or group of items. Either by memory, which is subject to error, or by reference to a facility map or plan, the employee must identify the location of the item, go to that location, pick the required quantity of that item for the order, and place them in an appropriate receptacle. This process is repeated until a given order is filled, at which time the employee will return to a central point for subsequent packing or shipping of the items in the order. Multiple opportunities for errors exist, from misreading the storage facility location label, to selecting from an incorrect, but adjacent shelf or other storage receptacle, to picking the wrong quantity of the correct item, or to putting the correct items in an incorrect receptacle for subsequent packing or shipping. In addition, many separate orders may require the same item, but in an exclusively manual system, batch order picking is most commonly the exception, rather than the rule, resulting in significant inefficiencies associated with repeated trips to pick each order separately.

Technology has advanced beyond the exclusively manual system of pick and put. The evolution of computer technology and related electronic systems has played a significant part in this advancement. U.S. Pat. No. 3,739,339 issued to Hillhouse on Jun. 12, 1973 describes a system that is characteristic of the status of current pick and put technology for many warehouse-like situations.

In the '339 patent, a computer punch-card system is used in which the row by column punch matrix of the card represents the storage location of items, and quantities of the item to be picked may also be encoded. At least one card reader is wired to a computer. When a card is inserted into a card reader positioned on a bay or similar group of discrete storage units, the configuration of punches activates a light system such that the precise location of the item is indicated by an illuminated element, and the quantity to be selected is displayed in a centrally located, lighted display. The system also provides for a put-to-light process with a separate light system wired to individual containers or receptacles. Major deficiencies of this system include the requirement of hard wire communications of the light systems, communications through the card reader to a central computer, and the fact that overall efficiency and performance of the system degrades as the number of lights increases. The system has virtually no fault tolerance since failure of the central computer causes the entire system to fail.

Radio communications have been applied to inventory related, selection applications. U.S. Pat. No. 5,877,698 issued to Kusiner, et al. on Mar. 2, 1999 describes a system of radio transmitters positioned throughout a supermarket with mobile receivers positioned on shopping carts commonly used by customers. When a receiver is within a limited range of any specific transmitter, an exclusive link is established whereby the transmitter sends to the receiver a specific advertising message calling attention to a "bargain" product at a specific nearby location. The link is broken as the receiver moves out of range of the local transmitter, but may establish links with other transmitters throughout the facility.

U.S. Pat. No. 6,124,800 issued to Beard and Bunte on Sep. 26, 2000 discloses and claims a route delivery system utilizing both local area network and wide area network radio frequencies to communicate inventory data between an end delivery point (such as a vending machine) and a stocked delivery vehicle, and between the vehicle and a base office to minimize the number of actual visits a service person must make to deliver the necessary inventory items to a specific end point as well as to simplify routing of the delivery vehicle.

U.S. Pat. No. 5,505,473 issued to Radcliffe on Apr. 9, 1996 and U.S. Pat. No. 5,877,962, a divisionally related patent issued to Radcliffe on Mar. 2, 1999 describe and claim respectively a computer-based system to facilitate proper placement of articles picked by an attendant from inventory storage shelves and deposited in delivery containers mounted on a cart and a method for the practical utilization of the system. In addition, the system and related method include an optional beacon light system to indicate the location of inventory items to be picked or recovered. The system of the '473 patent and related method of the '962 patent depend on a single intelligent element or computer that must maintain constant two-way radio communication between a receiver/central control unit mounted on a cart and between the optional beacon system located on storage shelves. A scanner mounted on the cart is used to read codes on either the location or item to be picked to validate the designated pick.

Current technology includes warehouse management systems wherein given a request for any specific item, the system responds by identifying the specific storage location in the facility.

More recently, U.S. Pat. No. 6,775,588 issued to the present inventor describes and claims a unique distributed intelligence, wireless, light-directed pick/put system having a bi-directional, dual transmitter/receiver element in wired communication with a portable computer and in wired or wireless communication with put- and pick-controller units in which the portable computer translates order location data into light addresses that are communicated by wireless means to a pick-controller unit positioned on a storage bay and in electrical communication with a plurality of intelligent light assemblies. Each intelligent light assembly is positioned at a unique location such that in response to the communicated, translated, order location data, a specific intelligent light assembly is activated, illuminating a character display, thereby indicating the location and quantity of the SKU to be retrieved from that location. Further, the portable computer, the bi-directional, dual transmitter/receiver element, and put-controller unit are positioned on a mobile element that has a plurality of receptacles positioned on it, each receptacle having a unique, intelligent light assembly positioned near it and wired to the put-controller unit such that in response to translated location data communicated from the portable computer through the bi-directional, dual transmitter/receiver element and then through the put-controller unit, a character display is activated indicating the quantities of any retrieved SKU to be put into each of one or more indicated receptacles. Each intelligent light assembly of the '588 patent includes a momentary contact switch which provides the means by which the attendant indicates that the designated pick or put has been completed.

Most typically in the art, a momentary contact switch takes the form of a button to be pressed, although other types of switches may be employed. Most of such switches require at least one moving part that is subject to wear and, more importantly, are permanently fixed in a set location. Thus, it is difficult to reconfigure storage bay shelves to accommodate differing location sizes, as a fixed momentary contact switch must be associated with each shelf location. Similarly, it is difficult to reconfigure mobile unit locations accommodating differing location sizes, as a fixed momentary contact switch must be associated with each mobile unit location.

Further, the light directed pick/put system of the '588 patent is a complete distributed intelligence system in which picks only may be performed from stationary storage bay shelf locations, which include intelligent light assemblies controlled by a pick-controller, and stationary mobile unit locations, which include intelligent light assemblies controlled by a put-controller.

SUMMARY OF THE INVENTION

Accordingly, a goal of this invention is to provide a light directed picking/putting system utilizing distributed intelligence to facilitate processing the picking of multiple customer orders such that the quantity of an item and its specific storage location in a facility are visually displayed to an attendant who retrieves (picks) the specific quantity of the indicated items and places (puts) them into one or more designated receptacles, in which either the storage locations from which items are picked, or the designated receptacles into which items are put, or both, are reconfigurable.

A further goal of this invention is to provide a pick/put system which is primarily light directed but which provides for the picking of items which are stored in areas of the facility that do not contain directing lights.

These and other goals are achieved by a reconfigurable light-directed pick/put system which includes at least one stationary storage bay unit including a plurality of reconfigurable physical storage locations for containing stored items to be picked and a plurality of intelligent light assemblies each of which intelligent light assemblies includes an intelligent circuit component, a visual display means, and a proximity switch means, and further wherein each of the intelligent light assemblies is positioned adjacent to a specific, physical storage location in a bay of storage locations, such that each of the intelligent light assemblies contains a specific light address associated with the physical location at which it is positioned, wherein upon reconfiguration of a physical storage location in order to accommodate items of differing size or quantity, the intelligent light assembly associated with the reconfigured physical storage location is readily repositionable therewith.

Moreover, these and other goals of the invention are still further achieved by a pick/put system for picking items contained in facility storage locations on at least one stationary storage bay unit, the system including at least one mobile unit, each mobile unit including a portable computer having data input means, data and instruction presentation means, and programmed capability to associate input facility location data with specific put locations; a put-controller unit comprising a bi-directional, transmitter/receiver component and an intelligent circuit element capable of controlling intelligent light assemblies, the put-controller unit having a unique controller address and being in bi-directional communication with the portable computer through a bi-directional, dual transmitter/receiver element; a mobile element capable of being propelled through a storage facility, wherein the put-controller unit is positioned on the mobile element, and the portable computer is positioned on the mobile element, and the bi-directional, dual transmitter/receiver element is positioned on the mobile element, and further including a power source for the portable computer and the put-controller unit; a plurality of storage receptacles positioned on the mobile element, each of the receptacles having associated therewith an intelligent light assembly comprising an intelligent circuit component, a visual display means, and a switch means, and further wherein each of the intelligent light assemblies is positioned adjacent to a specific receptacle, the intelligent light assemblies being controlled by the put-controller unit; and the bi-directional, dual transmitter/receiver element having a wired communication means for connecting to the portable computer and communication means for connecting to the put-controller unit.

BRIEF DESCRIPTION OF THE FIGURES OF THE DRAWING

The numerous purposes, applications, and advantages of the present invention may be better understood by those skilled in the art by reference to the following figures in which each reference number, regardless of the figure in which it is used, refers to the same part with the number as it initially is used and in which.

DETAILED DESCRIPTION OF THE PREFERRED EMBODIMENTS

The present invention is directed to a reconfigurable light-directed pick/put system which includes at least one stationary storage bay unit including a plurality of reconfigurable physical storage locations for containing stored items to be picked and a plurality of intelligent light assemblies for directing the pick. Each of the intelligent light assemblies includes an intelligent circuit component, a visual display means, and a proximity switch means, and each of the light assemblies is positioned adjacent to a specific, physical storage location in a bay of storage locations. Further, each of the light assemblies contains a specific light address associated with the physical location at which it is positioned. Upon reconfiguration of a physical storage location in order to accommodate items of differing size or quantity, the intelligent light assembly associated with the reconfigured physical storage location is readily repositionable therewith. This is achieved by providing an elongated raceway at each shelf of the storage bay. Each raceway houses a plurality of movable intelligent light assemblies behind a transparent raceway cover. As noted above, each light assembly includes a proximity switch, which requires no moving parts.

Figure 2:
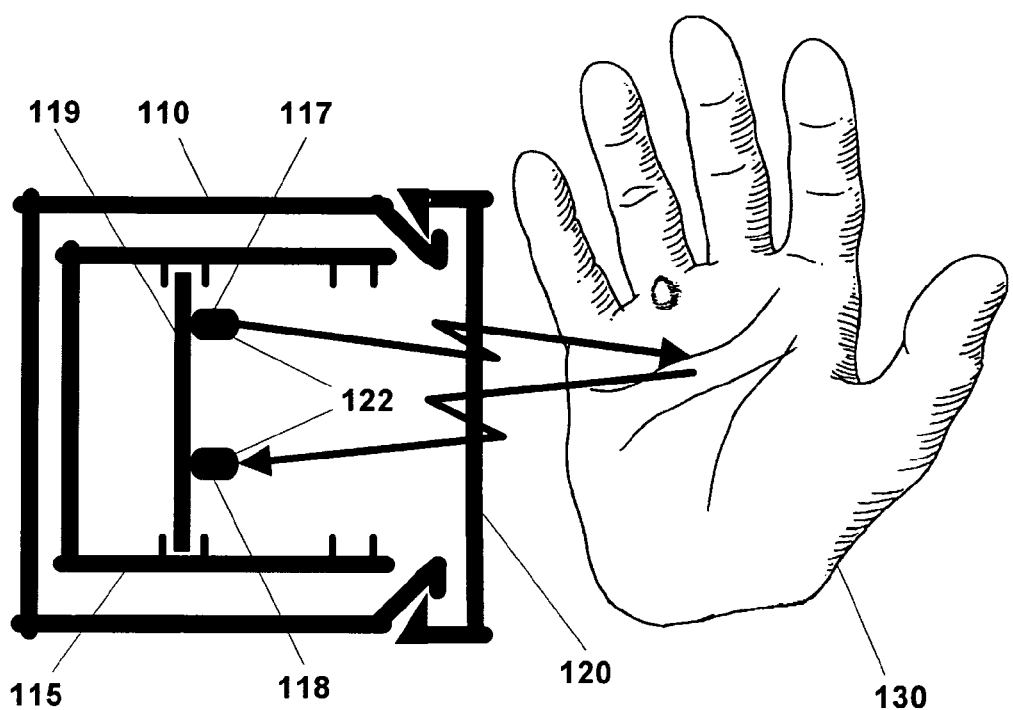
FIG. 2 is a schematic side cross-sectional view of a raceway containing an intelligent light assembly in accordance with the present invention and illustrating the means of operation of the proximity switch of the intelligent light assembly.
Figure 3:
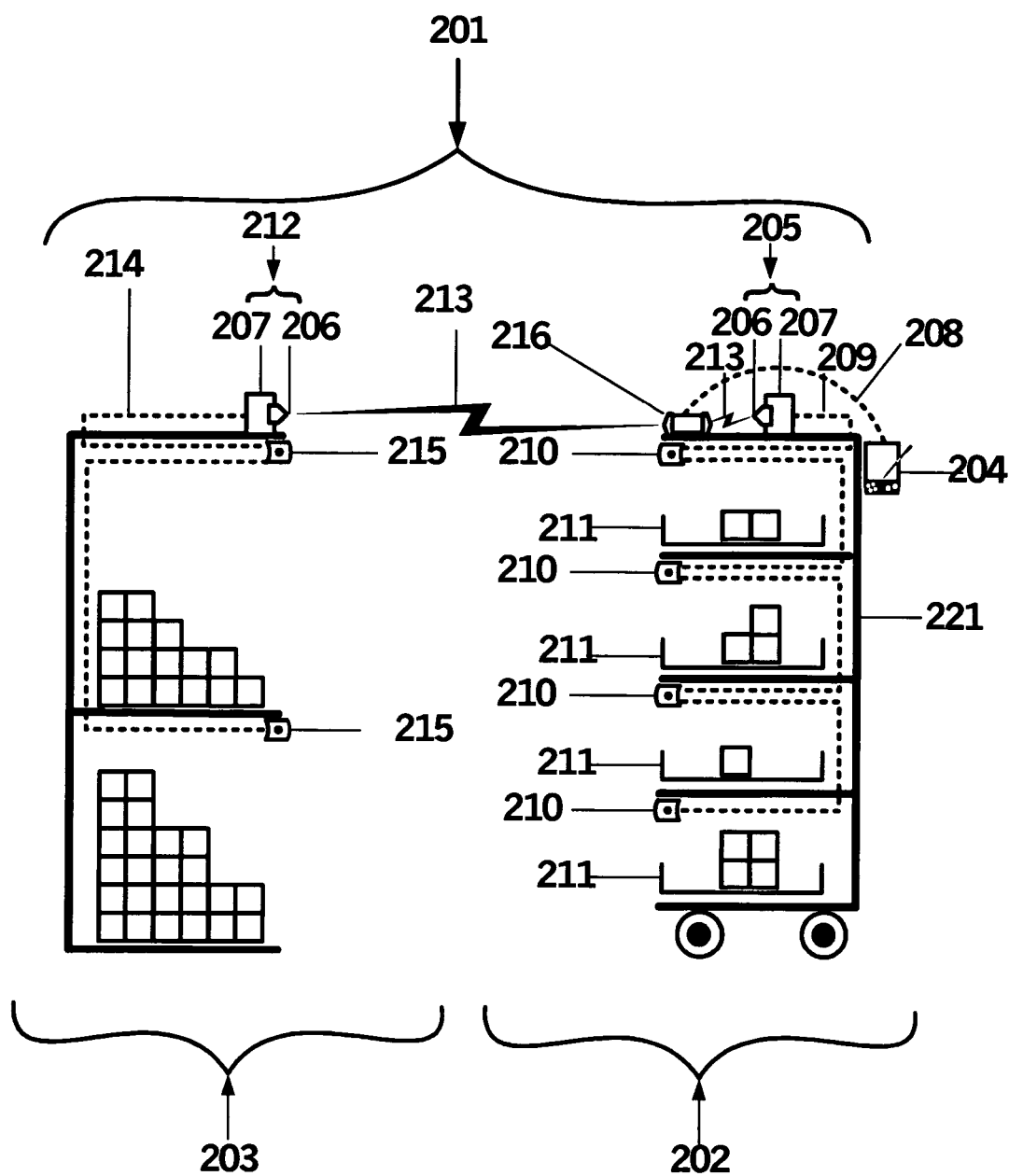
FIG. 3 is a schematic, block diagram of a light-directed, pick/put system with a single mobile unit, a single stationary unit, and lines of communication and their inter-relationships.

Although the principal features of the present invention are discussed in greater detail with respect to FIGS. 1 and 2, below, FIG. 3 presents the major elements and basic organization of a preferred, distributed, wireless, light-directed, pick/put system 201 in accordance with the present invention. Preferably, the system 201 comprises at least one mobile unit 202 and at least one stationary unit 203.

Each mobile unit 202 comprises a mobile element 221 on which are positioned a portable computer 204 and a put-controller unit 205. The put-controller unit comprises two integrated elements, a transmitter/receiver component 206 and intelligent circuitry element 207. Preferably, the portable computer 204 is in wired, bi-directional communication 208 with a bi-directional, dual transmitter/receiver element 216 that in turn is in wireless, bi-directional communication 213 with both the put-controller unit 205 and the pick-controller unit 212. The put-controller unit 205 is wired directly 209 for bi-directional communication, preferably using an RS-485 port, to a plurality of intelligent light assemblies 210. The intelligent light assemblies are positioned on or convenient to individual, removable receptacles 211 that are positioned on and transported by the mobile element 221.

In an alternative mode, the portable computer 204 uses the bi-directional, dual transmitter/receiver element 216 in a mode disconnected from the mobile unit 202 to communicate bi-directionally with put-controller unit 205 and pick-controller unit 212 and consequently controls the operation of intelligent light assemblies 210 and 215 by wireless means while walking from place to place.

The portable computer 204 also may include an integrated bar code reader used in associating light addresses with storage locations. The bar code reader may also be independent of, but capable of communicating with the portable computer via wireless means.

The stationary unit 203 as described in FIG. 3 comprises a pick-controller unit 212. The pick-controller unit 212 comprises a bi-directional, dual transmitter/receiver component 206 and an intelligent circuitry element 207. The put-controller unit 205 and pick-controller unit 212 are capable of being in bi-directional, wireless communication 213 with each other. The pick-controller unit 212 is in bi-directional, wired communication 214 with a plurality of intelligent light assemblies 215, each of which contains a unique light address and is positioned at a specific location on a storage bay with multiple locations.

Figure 4A:
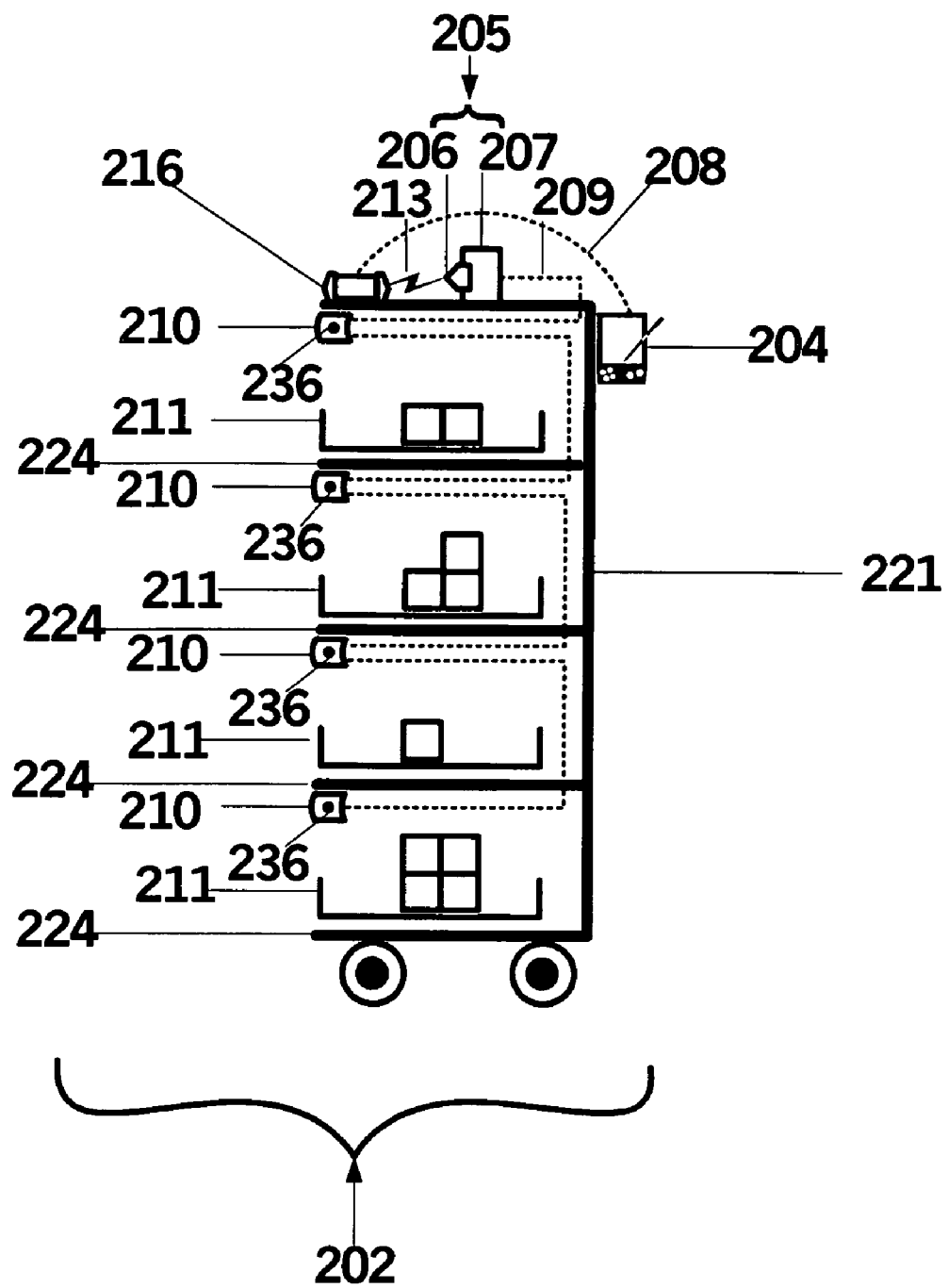
FIG. 4A is a detailed schematic diagram of a mobile unit of the system depicted in FIG. 3.

FIG. 4A provides details of the mobile unit 202. A mobile element 221 provides the structural frame for the mobile unit 202. In practice, the mobile element 221 may be any of a variety of custom or commercially available carts appropriate to move in a specific facility. Most commonly, the cart is moved by hand; however, the present invention also anticipates the use of motorized carts or trays carried on conveyors.

Receptacles 211 are positioned on shelves 224 of the mobile element 221. As is illustrated in FIG. 4A, the mobile element 221 has four shelves 224 with four receptacles 211 each positioned on a shelf 224. Various means may be used to secure the receptacles 211 on the shelves 224. An intelligent light assembly 210 is positioned on or convenient to each receptacle 211, and each intelligent light assembly 210 is wired 209 in a daisy-chain arrangement, in bi-directional communication, to the put-controller unit 205. Put-controller unit 205, in turn, is in bi-directional, wireless communication 213 with the bi-directional, dual transmitter/receiver element 216 that is in wired, bi-directional communication 208 with the portable computer 204. Each intelligent light assembly 210 includes a visual display means such as an LED or character display and a switch 236 or similar device. Switch 236 is used to set initial light addresses and to provide the means by which the attendant indicates that the designated put has been completed.

As is discussed in greater detail below, in a preferred embodiment of the present invention the intelligent light assemblies 210 contain proximity switches and are positioned on the shelves 224 within raceways that run along the length of each shelf. Thus, the light assemblies can be movable left or right inside the raceways along the length of the shelf and accommodate reconfiguration of the receptacles 211. Such raceways are discussed in greater detail with respect to the stationary unit, below.

Figure 4B:
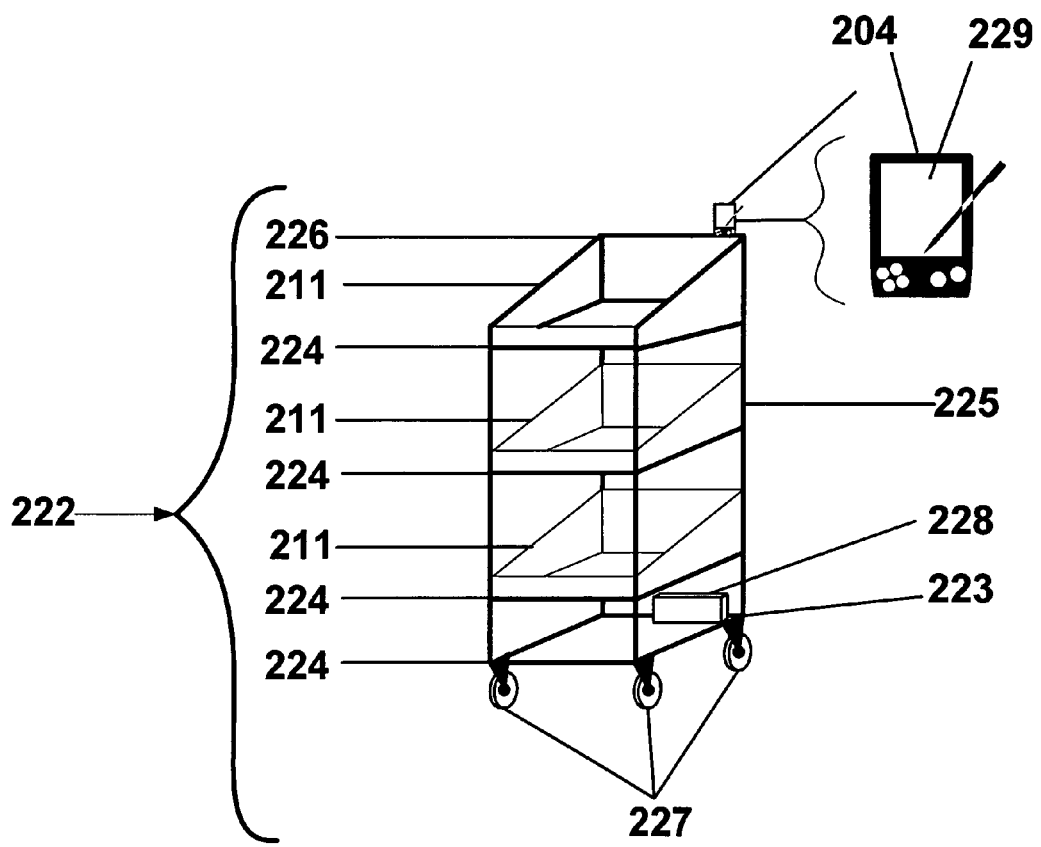
FIG. 4B is an illustration of a mobile unit illustrating the relative positions of the components described in FIG. 4A.

FIG. 4B illustrates an upright cart 222 with a base 223 supporting four casters 227 (only three of which are visible) a vertical frame 225 with a top support 226. As illustrated, the cart 222 has four shelves 224 with three receptacles 211 positioned on these shelves. A power source 228 is positioned on the back side of the cart.

As further illustrated in FIG. 4B, the portable computer 204 is removably positioned on the top support 226. The portable computer 204 is programmed to translate pick order location data to specific intelligent light assembly addresses. The portable computer 204 has visual display means 229, preferably an audio communications means, a keypad, and a touch screen capable of data entry with either a finger or stylus. In addition, the portable computer may receive pick order and other data and instructions by wireless means, by speech input, by disk transfer, by network linkage, by keypad entry, or comparable means. The portable computer also preferably has audio communication capabilities by means of an integrated microphone and speaker system.

In an alternative configuration, the bi-directional, dual transmitter/receiver element 216 of FIG. 3 may be attached or integral to the portable computer 204. In this configuration, the portable computer 204 may be operated independently of the cart 222.

Figure 5:
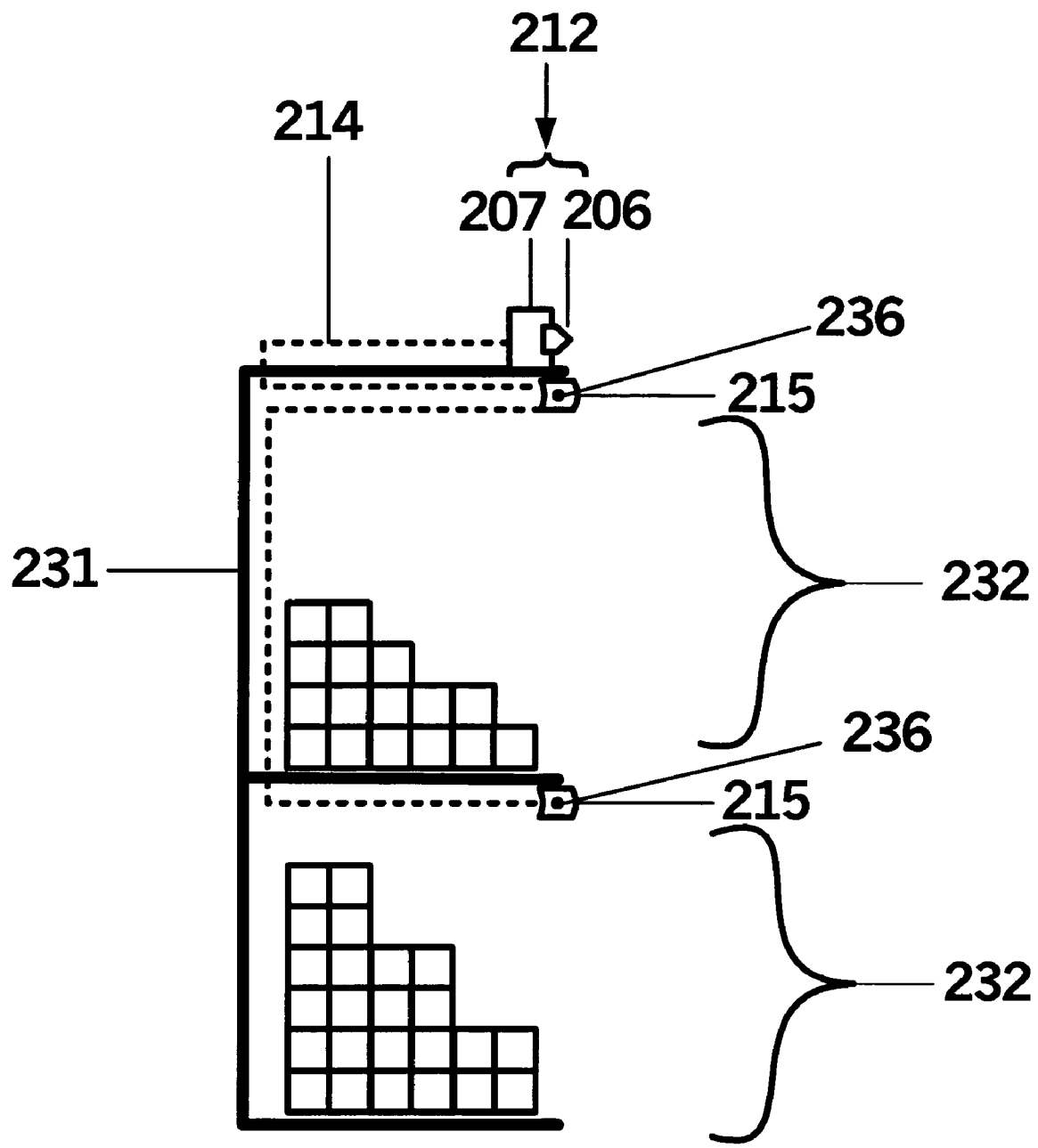
FIG. 5 is a detailed schematic diagram of a stationary unit of the system depicted in FIG. 3.

The details of a stationary unit are depicted in FIG. 5. As illustrated in FIG. 5, the pick-controller unit 212 is positioned on a bay 231, comprising a group of storage locations 232. An intelligent light assembly 215 that includes a light display means such as an LED or character display is positioned near each location 232 and wired 214 to the pick-controller unit 212. Each intelligent light assembly 215 includes a switch 236, or similar device. Power is provided through a connection to the entire stationary unit by means of either a central source of power or a battery.

The put- and pick-controller units comprise the same basic components and serve the same basic function. Both include a transmitter/receiver component and a controller circuitry element. Communication between both the put- and pick-controller units and the transmitter/receiver component is by wireless means such as radio frequency means or infrared means. One of average skill in the art will realize that the specific transmitter/receiver component will depend on the wireless means employed.

Thus, the basic organization of a preferred light-directed, pick/put system in accordance with the present invention is as described in earlier U.S. Pat. No. 6,775,588, which is hereby incorporated in its entirety by reference. The present invention represents an improvement over the earlier system most specifically in the presentation of the intelligent light assemblies on the stationary unit. By providing proximity switches rather than contact switches as described in the earlier patent the present invention provides a variety of advantages. First, as with all proximity switches, no moving parts are presented to the user such that there are no parts subject to wear or breakage. More importantly, the present movable intelligent light assemblies contained in raceways along the shelves of the stationary units allow the facility to be configured and reconfigured easily as necessary.

Figure 1:
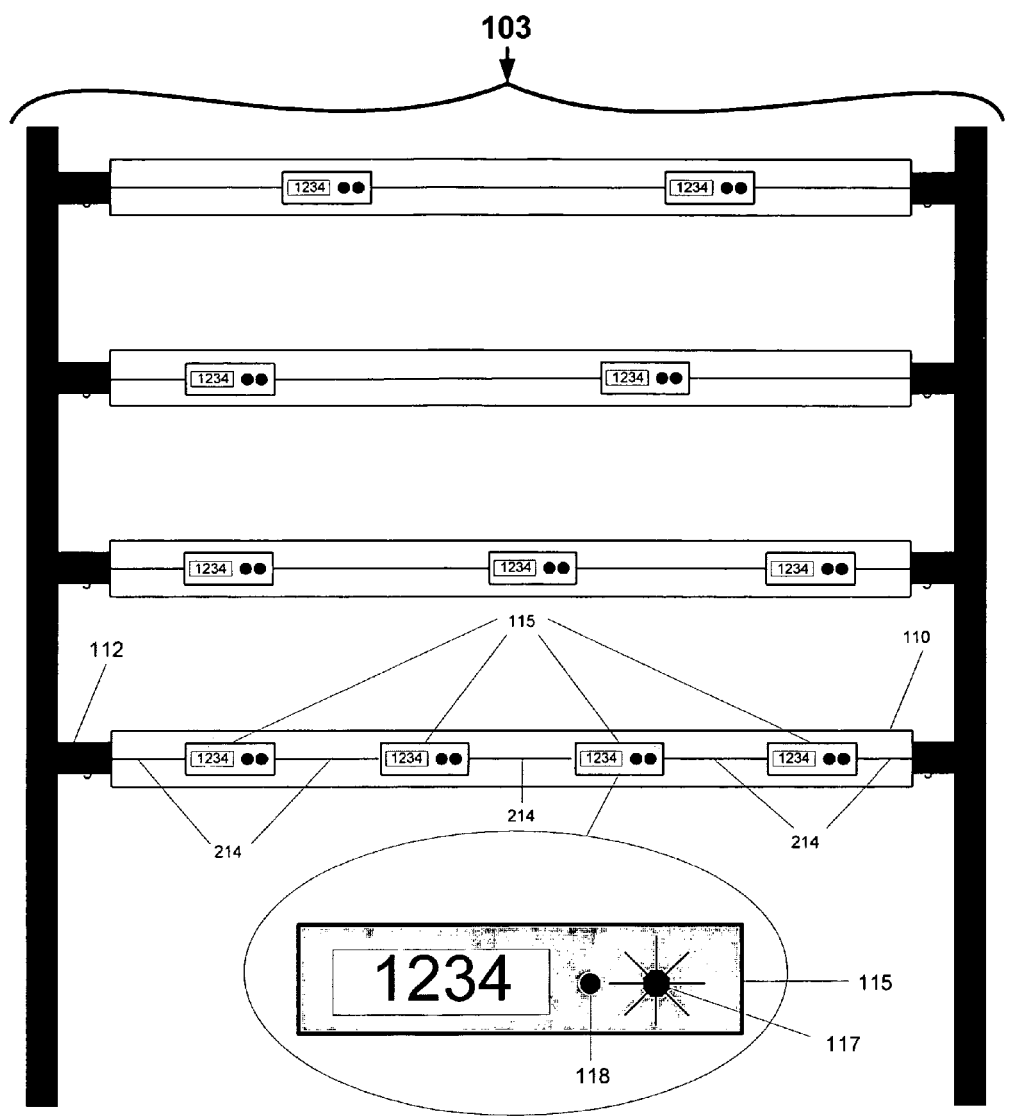
FIG. 1 is a front view of a stationary shelving unit of a light-directed, pick/put system having raceways containing movable and removable intelligent light assemblies.

Looking more specifically to the drawing of FIG. 1, a stationary unit 103 is represented schematically with raceways 110 provided on the front of each shelf 112. Intelligent light assemblies 115 are positioned within each raceway and are horizontally slidable. Each intelligent light assembly includes an LED display 116, a light source 117, and a light receiver 118, which is the operable portion of the proximity switch.

FIG. 2 is a cross-sectional side view of an intelligent light assembly 115 positioned within a raceway 110. Light source 117 and light receiver 118 are presented on the intelligent light assembly printed circuit board 119. Transmitted light 122 from light source 117 through optically transparent raceway cover 120 is reflected by the attendant's hand 130 and received by light receiver 118 in order to actuate the proximity switch. Thus, it is not necessary for the attendant to touch or depress a switch in order to verify that a pick has been completed.

Although the inclusion of a proximity switch somewhat simplifies the picking process and advantageously presents no movable parts for wear or breakage, the primary advantage of the present invention is that intelligent light assemblies may be added, removed or moved in order to reconfigure an individual storage bay or an entire facility. That is, once in place, prior art light directed systems, which include physical switches for indicating completion of a pick, cannot be acceptably reconfigured without substantial effort. Specifically in prior art systems light assemblies, conventional contact switches have been attached directly to the raceway cover. When the light assemblies are moved to the left or right the spacer sections of the raceway cover must be reduced or increased in size, usually by cutting and piecing together cut pieces. In order to avoid such cutting and piecing of raceway component pieces, oftentimes spacer pieces are not provided between the light assemblies or are not replaced when they are removed. But, the lack of a raceway cover often results in dirt and grime adversely affecting the electronics of the light assemblies. The present invention renders such facilities readily adaptable to changing conditions.

Further, the present invention is directed to a pick/put system substantially as described above which includes at least one mobile unit as described with respect to FIGS. 3 and 4A and 4B and which may include stationary units which are not equipped with intelligent light assemblies as set forth herein. Specifically, with respect to the present embodiment it is anticipated that some stationary units in a facility, perhaps in remote locations and containing items which are less frequently picked, may not have adjacent light assemblies. In accordance with the present invention those items may be picked in accordance with instructions received from visual and enunciated data and presentation instruction means of the portable computer on the mobile unit. Alternatively, the portable computer or computers on one or more mobile units may be programmed to identify and direct picks of items stored in a facility in which none of the storage units have adjacent light assemblies.

Preferred embodiments of the invention have been described using specific terms and devices. The words and terms used are for illustrative purposes only. The words and terms are words and terms of description, rather than of limitation. It is to be understood that changes and variations may be made by those of ordinary skill art without departing from the spirit or scope of the invention, which is set forth in the following claims. In addition it should be understood that aspects of the various embodiments may be interchanged in whole or in part. Therefore, the spirit and scope of the appended claims should not be limited to descriptions, figures, and examples herein.

What is claimed is:

1. A reconfigurable light-directed pick/put system comprising:
    at least one stationary storage bay unit comprising a plurality of reconfigurable physical storage locations for containing stored items to be picked and a plurality of intelligent light assemblies each of which intelligent light assemblies comprises an intelligent circuit component, a visual display means, and a proximity switch means, and further wherein each of the intelligent light assemblies is positioned adjacent to a specific, physical storage location in a bay of storage locations, such that each of the intelligent light assemblies contains a specific light address associated with the physical location at which it is positioned;
    wherein the intelligent light assemblies are slidably fixed within raceways, each raceway positioned on the at least one stationary storage bay unit adjacent to at least one reconfigurable physical storage location, such that upon reconfiguration of a physical storage location the corresponding intelligent light assembly is slidably moved, removed or added such that upon reconfiguration of a physical storage location in order to accommodate items of differing size or quantity, the intelligent light assembly associated with the reconfigured physical storage location is readily repositionable therewith.

2. The reconfigurable light-directed pick/put system set forth in claim 1 wherein intelligent light assemblies are added or removed to accommodate a varying number of physical storage locations on a stationary storage bay unit.

3. The reconfigurable light-directed pick/put system set forth in claim 1 further comprising at least one a mobile element capable of being propelled through a storage facility comprising at least one storage receptacle positioned thereon for putting picked items.

4. The reconfigurable light-directed pick/put system set forth in claim 3 wherein the mobile element comprises a plurality of reconfigurable storage receptacles positioned thereon and a plurality of intelligent light assemblies each of which intelligent light assemblies comprises an intelligent circuit component, a visual display means, and a proximity switch means, and further wherein each of the intelligent light assemblies is positioned adjacent to a specific, storage receptacle, such that each of the intelligent light assemblies contains a specific light address associated with the physical location at which it is positioned, wherein upon reconfiguration of a storage receptacle in order to accommodate put items of differing size or quantity, the intelligent light assembly associated with the reconfigured storage receptacle is readily repositionable therewith.

5. The reconfigurable light directed pick/put system set forth in claim 1 wherein the intelligent light assemblies are controlled directly by a central computer.

6. The reconfigurable light directed pick/put system set forth in claim 1 wherein the intelligent light assemblies are controlled indirectly by a central computer.

7. The reconfigurable light-directed pick/put system set forth in claim 1 further comprising:
  a. at least one mobile unit, each of the at one least mobile unit comprising:
    i. a portable computer comprising data input means, data and instruction presentation means, and programmed capability to associate input facility location data with unique light addresses and with specific put locations;
    ii. a put-controller unit comprising a bi-directional, transmitter/receiver component and an intelligent circuit element capable of controlling intelligent light assemblies, the put-controller unit having a unique controller address and being in bi-directional communication with the portable computer through a bi-directional, dual transmitter/receiver element;
    iii. a mobile element capable of being propelled through a storage facility, wherein the put-controller unit is positioned on the mobile element, and the portable computer is positioned on the mobile element, and the bi-directional, dual transmitter/receiver element is positioned on the mobile element, and further comprising a power source for the portable computer and the put-controller unit;
    iv. one or more storage receptacles positioned on the mobile element wherein each of the one or more receptacles has associated with it an intelligent light assembly comprising an intelligent circuit component, a visual display means, and a proximity switch means, and further wherein each of the intelligent light assemblies is positioned adjacent to a specific receptacle; and
    v. the bi-directional, dual transmitter/receiver element comprising a wired communication means for connecting to the portable computer and communication means for connecting to the put-controller unit and to a pick-controller unit; and
  b. the at least one stationary storage bay unit further comprising: the pick-controller unit comprising a transmitter/receiver component and an intelligent circuitry element wherein the pick-controller unit has a unique controller address and is in wireless, bi-directional communication with the bi-directional, dual transmitter/receiver element, and further wherein the pick-controller element is in electrical communication with the plurality of intelligent light assemblies of the stationary unit.

8. The reconfigurable light-directed pick/put system set forth in claim 7 wherein the mobile element comprises a plurality of reconfigurable storage receptacles positioned thereon and a plurality of intelligent light assemblies each of which intelligent light assemblies comprises an intelligent circuit component, a visual display means, and a proximity switch means, and further wherein each of the intelligent light assemblies is positioned adjacent to a specific, storage receptacle, such that each of the intelligent light assemblies contains a specific light address associated with the physical location at which it is positioned, wherein upon reconfiguration of a storage receptacle in order to accommodate items of differing size or quantity, the intelligent light assembly associated with the reconfigured storage receptacle is readily repositionable therewith.

9. The reconfigurable light-directed pick/put system of claim 7 wherein the data and instruction presentation means comprise visual display means.

10. The reconfigurable light-directed pick/put system of claim 7 wherein the data and instruction presentation means comprise enunciation means.

11. The reconfigurable light-directed pick/put system of claim 7 wherein the data and instruction presentation means comprise visual and enunciation means.

12. The reconfigurable light-directed pick/put system of claim 7 wherein the portable computer receives data and information via wireless communication from a second computer.

13. The reconfigurable light-directed pick/put system of claim 7 wherein the portable computer receives data and information via keypad entry.

14. The reconfigurable light-directed pick/put system of claim 7 wherein the portable computer receives data and information via wired communication from a second computer.

15. The reconfigurable light-directed pick/put system of claim 7 wherein the portable computer and the bi-directional, dual transmitter/receiver element are removably positioned on the mobile element and further wherein the bi-directional, dual transmitter/receiver element is integral to the portable computer.

16. The reconfigurable light-directed pick/put system set forth in claim 1 wherein each raceway has an optically transparent cover such that the proximity switch means of the underlying intelligent light assembly may be activated through the cover.

* * * * *